June 22, 1954 R. L. WALLACE, JR 2,681,996

TRANSISTOR OSCILLATOR

Filed Sept. 12, 1950 5 Sheets-Sheet 1

TYPE A TRANSISTOR
COLLECTOR CIRCUIT CHARACTERISTICS

VACUUM TUBE TRIODE
PLATE CIRCUIT CHARACTERISTICS

INVENTOR
R. L. WALLACE, JR.
BY Harry C. Hart
ATTORNEY

FIG. 2a

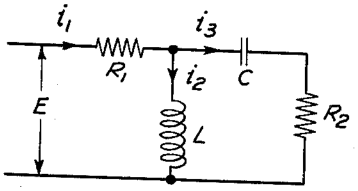

$$R_1 i_1 + jL\omega i_2 = E$$

$$-jL\omega i_2 + \frac{1}{jC\omega} i_3 + R_2 i_3 = 0$$

$$i_1 - i_2 - i_3 = 0$$

WHICH CAN BE WRITTEN $$e_{R_1} + e_L = E$$

$$-e_L + e_C + e_{R_2} = 0$$

$$i_1 - i_2 - i_3 = 0$$

FIG. 2b

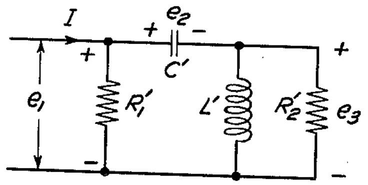

$$\frac{e_1}{\left(\frac{r^2}{R_1}\right)} + \frac{e_2}{\frac{r^2}{jL\omega}} = I$$

$$-\frac{e_2}{\left(\frac{r^2}{jL\omega}\right)} + \frac{e_3}{jr^2 C\omega} + \frac{e_3}{\left(\frac{r^2}{R_2}\right)} = 0$$

$$e_1 - e_2 - e_3 = 0$$

WHICH CAN BE WRITTEN $$i_{R_1'} + i_{C'} = I$$

$$-i_{C'} + i_{L'} + i_{R_2'} = 0$$

$$e_1 - e_2 - e_3 = 0$$

WHEN $$R_1' = \frac{r^2}{R_1}$$

$$C' = \frac{L}{r^2}$$

$$L' = r^2 C$$

$$R_2' = \frac{r^2}{R_2}$$

INVENTOR
R. L. WALLACE, JR.
BY Harry C. Hart
ATTORNEY

June 22, 1954 R. L. WALLACE, JR 2,681,996

TRANSISTOR OSCILLATOR

Filed Sept. 12, 1950 5 Sheets-Sheet 3

FIG. 3a

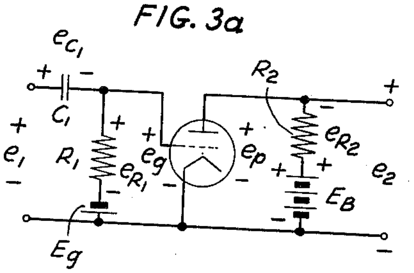

$$e_1 = e_{C_1} + e_{R_1} - E_g$$
$$e_g = e_{R_1} - E_g$$
$$E - e_{R_2} = e_p$$
$$e_2 = e_p$$

FIG. 3b

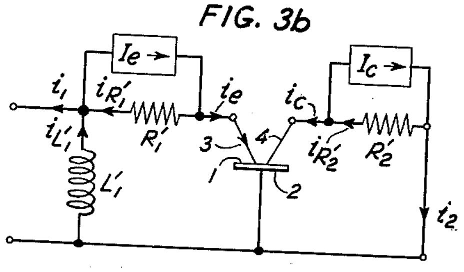

$$i_1 = i_{L_1'} + i_{R_1'} - I_e$$
$$-i_e = i_{R_1'} - I_e$$
$$I_c - i_{R_2'} = -i_c$$
$$i_2 = -i_c$$

$$R_1' = r^2 R_1$$
$$R_2' = r^2 R_2$$
$$L_1' = r^2 C_1$$

FIG. 3c

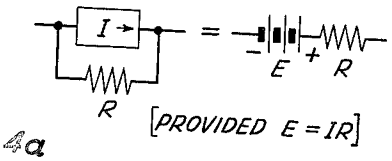

[PROVIDED $E = IR$]

FIG. 4a

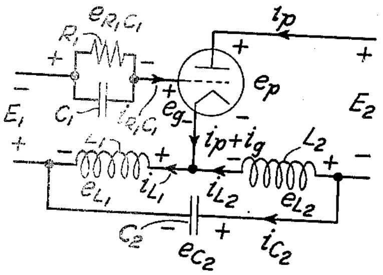

$$E_1 + e_{L_1} + e_g + e_{R_1C_1} = 0$$
$$E_2 - e_p + e_{L_2} = 0$$
$$e_{L_1} + e_{L_2} - e_{C_2} = 0$$
$$i_{C_2} + i_{L_1} - i_{R_1C_1} = 0$$
$$i_{C_2} + i_{L_2} + i_p = 0$$
$$i_{L_2} - i_{L_1} + i_p + i_g = 0$$

FIG. 4b

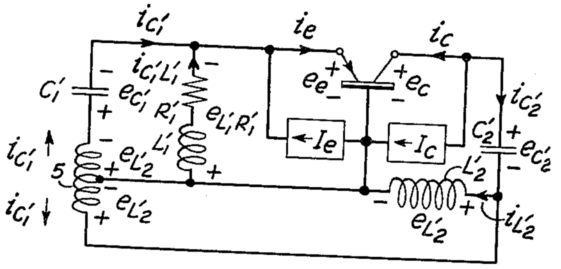

$$I_e + i_{C_1'} - i_e + i_{R_1'L_1'} = 0$$
$$I_c + i_c + i_{C_2'} = 0$$
$$i_{C_1'} + i_{C_2'} - i_{L_2'} = 0$$
$$e_{L_2'} + e_{C_1'} - e_{R_1'L_1'} = 0$$
$$e_{L_2'} + e_{C_2'} - e_c = 0$$
$$e_{C_2'} - e_{C_1'} - e_c - e_e = 0$$
$$R_1' = \frac{r^2}{R_1}$$
$$L_1' = r^2 C_1$$
$$L_2' = r^2 C_2$$
$$C_1' = \frac{L_1}{r^2}$$
$$C_2' = \frac{L_2}{r^2}$$
$$r^2 = r_p r_c$$

INVENTOR
R. L. WALLACE, JR.
BY Harry C. Hart
ATTORNEY

June 22, 1954 R. L. WALLACE, JR 2,681,996

TRANSISTOR OSCILLATOR

Filed Sept. 12, 1950 5 Sheets-Sheet 4

INVENTOR
R. L. WALLACE, JR.
BY Harry C. Hart
ATTORNEY $$-i_p = i_R + i_x$$
$$-i_g = i_R - i_x$$
$$-e_p = -\tfrac{1}{2}e_R - \tfrac{1}{2}e_x$$
$$-e_g = e_x - e_p = -\tfrac{1}{2}e_R + \tfrac{1}{2}e_x$$

$$e_c = e_{R'} + e_{x'}$$
$$e_e = e_{R'} - e_{x'}$$
$$i_c = -\tfrac{1}{2}i_{R'} - \tfrac{1}{2}i_{x'}$$
$$i_e = i_{x'} + i_c = -\tfrac{1}{2}i_{R'} + \tfrac{1}{2}i_{x'}$$

INVENTOR
R. L. WALLACE, JR.
BY Harry C. Hart
ATTORNEY

Patented June 22, 1954

2,681,996

UNITED STATES PATENT OFFICE 2,681,996

TRANSISTOR OSCILLATOR

Robert L. Wallace, Jr., Plainfield, N. J., assignor to Bell Telephone Laboratories, Incorporated, New York, N. Y., a corporation of New York Application September 12, 1950, Serial No. 184,459

6 Claims. (Cl. 250—36)

This invention relates to transistor translating circuits.

The general objects of the invention are to provide novel transistor circuits, and particularly transistor oscillator circuits, of improved performance. Those of the transistor circuits so provided which are chosen for illustration exemplify the central principle of the invention and the design principles according to which not only these illustrative circuits but many others, too, are derived and may be constructed.

The transistor, which is the subject of a patent application of John Bardeen and W. H. Brattain, Serial No. 33,466 filed June 17, 1948, now Patent 2,524,035, issued October 3, 1950, is a three-electrode device capable of amplifying electric signals. Upon the announcement of the invention of the transistor, it was generally treated as analogous to a vacuum tube and efforts were made to amplify and otherwise translate electric signals by means of conventional circuits whose performance in connection with vacuum tubes has become well known, the only change made being to substitute a transistor for the vacuum tube. These efforts were often of doubtful success, and the reason was believed to be that the transistor was at best a very imperfect analog of the vacuum tube.

Among the various points of departure of the transistor from perfect analogy with the vacuum tube, those principally remarked upon have been its low input impedance and the fact that it is essentially a current-operated device, as compared with the high input impedance and voltage operation of the vacuum tube triode. It was believed that such points of dissimilarity constituted defects, perhaps temporary only, in the transistor, and it was hoped that improvements in fabrication procedures would result in transistors which should be more nearly perfect analogs of the vacuum tube, in which case improved performance in conventional circuits might be expected. At the same time a number of novel circuits were constructed which appeared to take advantage of the peculiar characteristics of the transistor, but the search for such new circuits was necessarily conducted in a somewhat haphazard fashion.

The present invention is based upon the realization that the transistor approximates the dual counterpart of a vacuum tube triode much more closely than it approximates the analog of the tube, and that, in fact, it approximates the tube dual very closely indeed; and that this duality relation holds not only in a qualitative sense but in a quantitative sense as well, as may be immediately seen by comparison of the transistor collector voltage-current characteristic for various values of emitter current with the tube anode current-voltage characteristic for various values of the grid voltage. Thus, generally speaking, the more imperfect the parallel on the analogy basis, the more reliable and complete is the parallel on the duality basis.

The invention is further based upon the realization that when excellent performance is known to be obtainable from a particular circuit configuration of which a vacuum tube is a part, then comparable performance can be expected from a transistor circuit which is the dual of the known vacuum tube circuit, and of which the transistor, itself an approximate dual of the vacuum tube, forms a part.

As examples of the application of the foregoing principles the specification which follows will refer briefly to a number of common vacuum tube oscillator circuits and the transistor dual counterpart of each one will be derived and its operation will be discussed. Each of the resulting transistor oscillator circuits is specifically different from the most nearly similar vacuum tube oscillator circuit. In general, tests have shown that the performance of a transistor oscillator of which the coupling network external to the transistor proper is the dual counterpart of the corresponding external network in the case of some well-known vacuum tube oscillator circuit is found to be far more reliable in operation than is a transistor oscillator circuit which is merely the result of substituting, in a well-known vacuum tube circuit, the transistor for the tube.

The invention will be fully apprehended from the following detailed description of the principles upon which it is based and of certain specific embodiments thereof taken in connection with the appended drawings, in which:

Figs. 1*a* and 1*b* show a family of conventional vacuum tube voltage-current characteristics and a family of transistor current-voltage characteristics, placed side by side for comparison;

Figs. 2*a* and 2*b* are circuit diagrams showing two passive networks each of which is the dual of the other, together with their defining equations;

Fig. 3*a* is a schematic circuit diagram showing a conventional vacuum tube amplifier while Fig. 3*b* shows its dual counterpart, a transistor amplifier, the defining equations of each being set forth side by side for comparison;

Fig. 3*c* is a diagram illustrating the equivalence of Thevenin's theorem;

Fig. 4*a* is a schematic circuit diagram showing a vacuum tube oscillator circuit of the so-called Hartley type, together with its defining equations, while Fig. 4*b* shows its dual, a transistor oscillator, the defining equations of each being set forth side by side for comparison;

Fig. 5 shows a modification of the circuit of Fig.

4b which is still the dual counterpart of a Hartley oscillator;

In Fig. 6 the signal frequency portions of the vacuum tube Hartley oscillator of Fig. 4a have been redrawn to bring out certain features;

The principle of duality, which for general purposes is well explained by E. A. Guillemin in "Communication Networks" (Wiley 1935) vol. 2, pages 246 and following, arises from a recognition that the following pairs of equations are mutually reciprocal in nature:

$$e=Ri \qquad i=Ge$$

and $$e=L\frac{di}{dt} \qquad i=C\frac{de}{dt}$$

where all of the symbols have their conventional meanings. Any quantity which in this sense is the reciprocal of another quantity is said to be the dual of that quantity. These equations, taken in pairs, are duals, and they show that complete duality exists between voltage, current, and the electric circuit elements. We have

| *Quantity* | *Dual quantity* |
|---|---|
| Voltage | Current |
| Resistance | Conductance |
| Inductance | Capacitance |

Figure 1B:
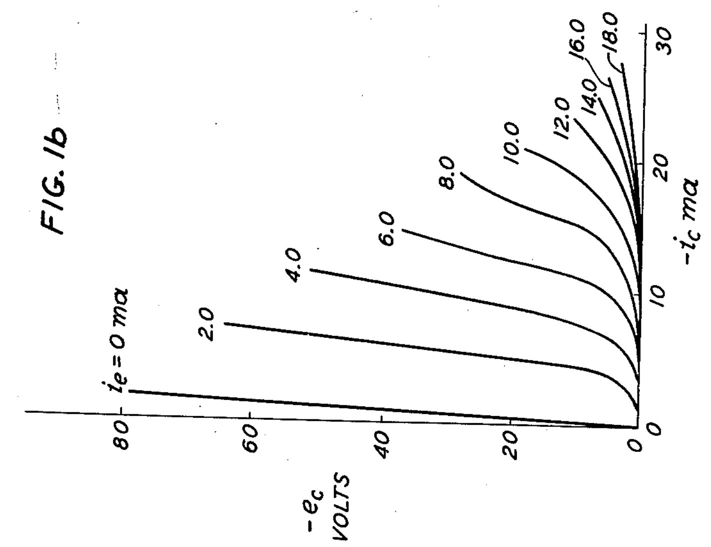
Figure 1A:
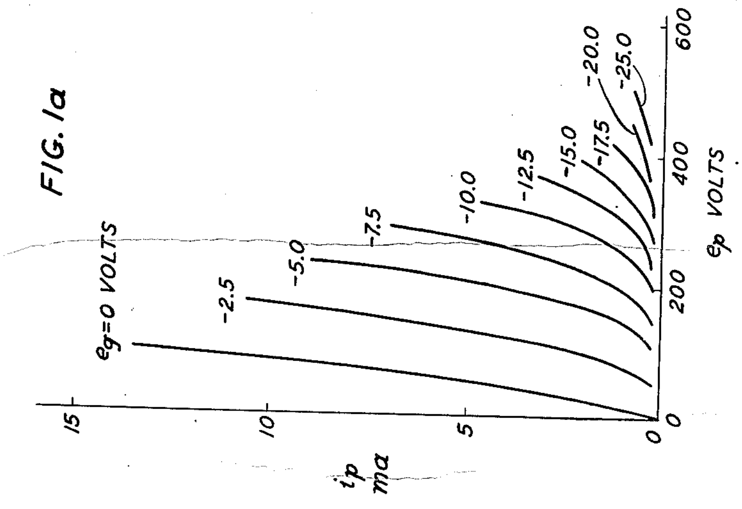

The vacuum tube is essentially a voltage amplifying device while the transistor is essentially a current amplifying device. This fact, which has been recognized for some time, hints that the relation between vacuum tubes and transistors is not one of similarity but rather of duality; that is, that the roles of current and potentials in the transistor are just interchanged by comparison with their roles in the vacuum tube. Figs. 1a and 1b illustrate and confirm this statement. They show a family of static characteristics of a vacuum tube, as widely published in texts and handbooks, plotted beside a corresponding family of N-type transistor characteristics, as published, for example, by R. M. Ryder and R. J. Kircher in "Some Circuit Aspects of the Transistor," Bell System Technical Journal, July 1949, page 367 (vol. 28). When the axes are chosen in the manner shown, the two families of curves are almost identical in shape. The quantities which behave similarly are $$e_p \text{ and } -i_c$$
$$i_p \text{ and } -e_c$$
$$-e_g \text{ and } i_e$$

and, approximately, $$-i_g \text{ and } e_e$$

The consistent difference in sign is of no significance with respect to duality considerations because it could be removed by a reversal of all the sign conventions for the transistor; and in fact the signs are all reversed for a P-type transistor. Comparison of the two families of characteristics of Figs. 1a and 1b indicates that the transistor collector circuit is an aproximate dual of the vacuum tube plate circuit and that the emitter circuit is an approximate dual of the vacuum tube grid circuit. In particular, they show that the base, the emitter and the collector electrodes of the transistor correspond, dualitywise, to the cathode, the grid, and the anode of the tube.

Now that this dual relationship has been found, a problem arises as to what it means with respect to the design and performance of transistor translating circuits. Since the transistor is not so much the analog of the vacuum tube as its dual, it may be supposed that transistor circuits should not be similar to vacuum tube circuits but rather dual to them. This implies that if it is desired to duplicate, with a transistor, the performance of a known vacuum tube circuit, what is called for is not merely to remove the vacuum tubes and replace them with transistors but rather to first alter the circuit in such a way that the roles of currents and potentials are interchanged in all the passive elements of the circuit as well as in the active ones.

After such circuits have been found, the operating biases should be chosen in such a way as to take into account the following dual situations, stated with respect to N-type transistors. (With P-type transistors, the signs of all biases are to be reversed.)

I. Biasing the vacuum tube grid positively with respect to its cathode so that grid current begins to flow corresponds to biasing the transistor emitter negatively with respect to its base so that negative emitter potential begins to increase.

II. Biasing the vacuum tube grid sufficiently negative to reduce anode current essentially to zero corresponds to biasing the transistor emitter sufficiently positive to reduce collector voltage essentially to zero.

III. Biasing the vacuum tube anode negatively so that anode current is reduced to zero corresponds to biasing the transistor collector positively so that the collector voltage is reduced approximately to zero.

*The dual of a simple ladder network*

The foregoing may be illustrated by the design of the dual of the simple ladder network of Fig. 2a. The first step in finding the dual is to write down the Kirchhoff equations for the circuit.

These are $$R_1i_1+jL\omega i_2=E$$

$$-jL\omega i_2+(1/jC\omega)i_3+R_2i_3=0$$

and $$i_1-i_2-i_3=0 \qquad (1)$$

Now, in these equations every $i$ is to be replaced by $e/r$ and every $e$ by $ri$. The quantity $r$ is a constant of the transformation which in this case can be given any positive or negative value. The effect of $r$ is to determine how many volts in the dual circuit are equivalent to one ampere in the original. If the circuit includes a vacuum tube then the value of $r$ is fixed by the relation between the vacuum tube quantities and the corresponding quantities of the transistor which is to replace the tube. In this case $$r^2=r_cr_p \qquad (2)$$

where $r_c$ is the collector resistance of the transistor and $r_p$ is the plate resistance of the vacuum tube.

When Equations 1 are transformed as indicated, they become $$\frac{e_1}{(r^2/R_1)}+\frac{e_2}{(r^2/jL\omega)}=I$$

$$-\frac{e_2}{(r^2/jL\omega)}+\frac{e_3}{(jr^2C\omega)}+\frac{e_3}{(r^2/R_2)}=0 \qquad (3)$$

$$e_1-e_2-e_3=0$$

These are the equations which apply to the dual circuit. A circuit which will fit them must now be found. To do so, it may be noted that the term $e_1/(r^2/R_1)$ denotes the current through a resistance of value $R'_1=r^2/R_1$, provided $e_1$ is interpreted as the voltage drop across this resistance. The dual circuit must then contain this resistance $R'_1$ with a voltage drop $e_1$ across it. Carrying this reasoning through for the other terms in the first two of Equations 3 leads to the conclusion that the dual circuit contains the following elements:

$$R'_1=r^2/R_1$$

$$R'_2=r^2/R_2$$

$$C'=L/r^2$$

$$L'=r^2C \qquad (4)$$

From the foregoing it may be seen that in passing from any circuit to its dual, every voltage is replaced by a current, every current by a voltage, every resistance by a conductance and vice versa, every inductance by a capacitance and vice versa. Equations 3 can now be written in a simpler notation as follows:

$$i_{R'_1}+i_{C'}=I$$

$$-i_{C'}+i_{L'}+i_{R_2}=0 \qquad (5)$$

$$e_1-e_2-e_3=0$$

where $i_{C'}$ means the current through a capacitance of value $C'$ etc.

All the elements in the dual circuit are now known and the Kirchhoff Equations 5, tell how these elements must must be connected together; i. e., they are to be interconnected as shown in Fig. 2*b*.

The notation employed in Equations 5 is a very useful one, and now that more is known about how the transformation will turn out, a substantial saving of effort can be effected by applying this same notation to the original Equations 1.

Let $e_L$ stand for the voltage across L (measured in such a direction that $i_L$ flows from + to —) and let a similar notation be employed for every $e$. Equations 1 and their duals thus become $$e_{R_1}+e_L=E \qquad i_{R'_1}+i_{C'}=I$$

$$-e_L+e_C+e_{R_2}=0 \qquad -i_{C'}+i_{L'}+i_{R'_2}=0$$

$$i_{R_1}-i_L-i_C=0 \qquad e_{R'_1}-e_{C'}-e_{L'}=0$$

$$i_C=i_{R_2} \qquad e_{L'}=e_{R'_2} \qquad (6)$$

It may be noted that a fourth equation has been added to express the fact that the current through C is the same as that through $R_2$. The need for this can be avoided if the notation is extended somewhat to include terms such as $i_{R_2C}$, which denotes the current which flows through $R_2$ and C and implies that the current through $R_2$ is the same as that through C. The corresponding term in the dual equation then becomes $e_{R_{2'}L'}$ which denotes the voltage across $R_{2'}$ and L′ and implies that the two voltages are the same.

It can be seen by inspection of Equations 6 that the dual transformation amounts to making the following substitutions:

$$E\rightarrow I \qquad i_L\rightarrow e_{C'}$$

$$e_{R_1}\rightarrow i_{R'_1},\ e_{R_2}\rightarrow i_{R'_2} \qquad e_C\rightarrow i_{L'}$$

$$i_{R_1}\rightarrow e_{R'_1},\ i_{R_2}\rightarrow e_{R'_2} \qquad i_C\rightarrow e_{L'}$$

$$e_L\rightarrow i_{C'} \qquad (7)$$

It can also be seen from Figs. 2*a* and 2*b* that circuit elements in series are transformed into elements in parallel and vice versa, while mesh equations become node equations and vice versa. This holds in general and is of assistance in finding circuits to fit the dual equations.

Furthermore, the input terminals of Fig. 2*b* may be said to correspond, dualitywise, with the input terminals of Fig. 2*a*, while the output terminals of Fig. 2*b* correspond, dualitywise, with the output terminals of Fig. 2*a*, and the same holds for any dual pair of networks each of which has input terminals and output terminals.

*The dual of a single R. C. coupled amplifier stage*

The procedure for finding the dual of a circuit which contains a vacuum tube triode is the same as that described for a passive network except that the following additional substitutions must be made:

$$e_p\rightarrow -i_c$$

$$i_p\rightarrow -e_c$$

$$e_g\rightarrow -i_e \qquad (8)$$

and $$i_g\rightarrow -e_e$$

Fig. 3*a* shows a vacuum tube amplifier circuit of conventional design and four of the equations which describe it. Fig. 3*b* shows the transformed equations and a transistor circuit which satisfies them. Here, as in other figures to follow, the semiconductive body of the transistor is represented by a thin rectangle 1, its base electrode by a heavy line 2, its emitter electrode by a thin wire 3 bearing an arrowhead pointed toward the body, and lying at an angle with the body surface, and its collector electrode by another thin wire 4 at an equal and opposite angle but without an arrowhead. As in the case of Figs. 2*a* and 2*b*, the constant voltage source $E_B$ which supplies operating bias voltage to the vacuum tube anode circuit has been transformed into a constant current source $I_C$ which supplies bias current to the transistor collector, and the conventional symbol for a constant voltage source such as a battery is replaced, in Fig. 3*b* and in other figures to follow, by a conventionalized box containing a capital letter I, designating a constant current, together with a distinguishing subscript and an arrow to indicate its direction of flow. Similarly the grid bias constant voltage source $E_g$ has been transformed into an emitter bias constant current source $I_e$. These constant bias currents are not to be confused with the actual collector and emitter currents. The actual emitter current is in fact equal to the sum of the emitter bias current $I_e$ and the current $i_{R'_1}$ which flows through the resistor $R'_1$ connected in parallel with the current source, while the actual collector current is in fact equal to the sum of the collector bias current $I_c$ and the current $i_{R'_2}$ which flows through the resistor $R'_2$, are connected in parallel with the current source. These relations are stated mathematically in the second and third equations under the figure.

Now it is well known in electric circuit analysis that the parallel combination of a source of current I with a resistor R is, from the standpoint of external measurements, equivalent to the series combination of a source of voltage E with the same resistor R, provided the magnitude of the voltage source is chosen to satisfy the relation $$E=IR$$

which is known as Thevenin's theorem. This equivalence is depicted in Fig. 3c.

Because constant voltage sources are more common and less costly than constant current sources, it is usually preferred, as a practical matter, to realize the transistor current supplies by way of the circuit shown to the right in Fig. 3c, than by the one shown to the left. Furthermore this arrangement involves a smaller consumption of direct-current power in the resistor R. Accordingly, the parallel constant current sources of Fig. 3b may be replaced in the figures to follow by series constant voltage sources and whose magnitudes satisfy the relation (9). Just as in the conventional vacuum tube amplifier of Fig. 3a, for high voltage gain at the output terminals the resistor $R_2$ should be of large resistance and the anode voltage supply $E_B$ should be of high potential, so, in such an arrangement, for high current gain the load resistor should be of low resistance, and the injected bias current $I_c$ should be large.

*The dual of a Hartley oscillator*

Fig. 4a is a circuit diagram showing a vacuum tube oscillator of the well-known Hartley type in which two inductance coils, designated $L_1$ and $L_2$, respectively, are connected between the plate and the grid, the cathode of the tube being connected to their mid-point, while a condenser $C_2$ is connected across the end terminals of the coils. Feedback from plate to grid is thus achieved by way of the parallel combination of the two coils $L_1$, $L_2$ and the condenser $C_2$. As is well known, the frequency of oscillation of the network is given, approximately neglecting terms due to the plate resistance of the tube and other second order effects, by the expression:

$$\omega=2\pi f=\sqrt{\frac{1}{C_2(L_1+L_2)}} \qquad (10)$$

and a further condition for oscillation is that the voltage amplification factor $\mu$ of the tube shall satisfy the relation $$\mu=\frac{L_2}{L_1} \qquad (11)$$

In accordance with common practice there is also provided a condenser $C_1$ shunted by a grid leak resistance $R_1$ in series with the grid of the tube, which serves as an automatic grid bias device, and so holds the amplitude of the oscillations to a level such that grid current is drawn only during a small fraction of each cycle of operation.

The equations which define the operation of the circuit of Fig. 4a are set forth immediately below the figure. To the right are shown the equations which result when the dual transformation described above is applied to the equations of Fig. 4a. Thus the equations to the right define the operation of the dual counterpart of the Hartley oscillator of Fig. 4a, and above them is a schematic circuit diagram of a transistor oscillator circuit which satisfies these equations. It will be observed that the transformation has converted the coils $L_1$ and $L_2$ of Fig. 4a into condensers $C'_1$ and $C'_2$ in Fig. 4b while the condenser $C_2$ of Fig. 4a has found its counterpart in the coil $L'_2$ of Fig. 4b.

A special problem is encountered in finding a transistor circuit to satisfy the defining equations of Fig. 4b and, in general, in constructing a transistor dual counterpart of a single vacuum tube circuit having feedback from its plate to its grid. This problem is well illustrated by solving the fifth and sixth defining equations of Fig. 4b, which leads to the equation $$-e_{L'_2}=+e_{C'_1}+e_e$$

This equation requires that the negative of the voltage across $L'_2$ be made equal to the sum of $e_{C'_1}$ and $e_e$.

In order to satisfy this requirement while at the same time satisfying all the other defining equations it is necessary to use a phase reversing transformer in the dual circuit. The ideal transformer, 5, of Fig. 4b accomplishes this result and the circuit shown satisfies all the defining equations and is, hence, a satisfactory dual.

Had another pair of the defining equations been solved together, instead of the fifth and sixth, a different equation would have resulted, and this different equation would indicate the need of a phase reversing transformer at a different point of the circuit. Just where it is included is of no consequence as long as the final circuit satisfies all of the defining equations.

The need for this transformer, which has no dual counterpart in the vacuum tube circuit of Fig. 4a, arises in the following way. Although transistor currents and potentials are closely dual to their vacuum tube counterparts as previously noted, the conventions of assigning directions to the transistor quantities are not completely consistent with duality. For this reason it sometimes happens that the dual equations cannot be satisfied without using a transformer. Similarly it sometimes happens that a vacuum tube circuit which includes a phase reversing transformer leads to a transistor circuit which can be realized without a transformer.

In any case the desired circuit is one which satisfies the defining dual equations, regardless of whether a transformer is required in satisfying the equations.

The frequency at which the circuit of Fig. 4b oscillates is given by the expression $$\omega=2\pi f=\sqrt{\frac{1}{L'_2(C'_1+C'_2}} \qquad (12)$$

and a further condition for oscillation is that the current amplification factor $\alpha$ of the transistor shall satisfy the relation $$\alpha=\frac{C'_2}{C'_1} \qquad (13)$$

The dual counterpart of the grid-leak-condenser combination of Fig. 4*a* is furnished in Fig. 4*b* by the series combination of the resistor $R'_1$ and the inductance coil $L'_1$. In Fig. 4*a* the automatic bias action takes place by reason of the fact that the grid current drawn on the occurrence of an excessive positive peak of the applied signal charges the condenser with such a polarity that the stored charge acts to supplement the original steady negative bias. The action of the circuit of Fig. 4*b* is dual to this, because, upon the occurrence of an excessive negative signal peak tending to drive the emitter of the transistor below its current cut-off, the current through the upper winding of the transformer 5 is then all drawn through the inductance coil $L'_1$; and this current thus stored in this inductive element operates, upon the next half cycle, to augment the steady bias supplied by the bias current $I_e$. For efficient action in this manner the impedance of the signal source which drives the transistor amplifier should be high, thus being the dual counterpart of the source which drives the tube, whose impedance should be low.

Figure 5:
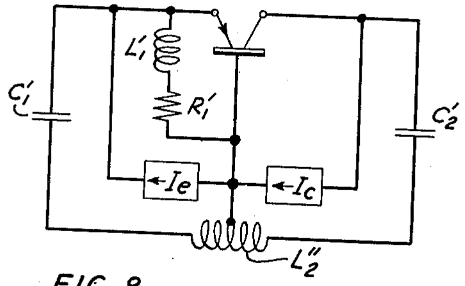

Quite apart from the matter of duality it is known that the combination of a coil with an ideal transformer, e. g., of the coil $L'_2$ of Fig. 4*b* with the transformer 5 at the left of the figure is equivalent to a transformer of inductance $L'_2$ in each winding and unity coupling between the windings. Such an arrangement is shown in Fig. 5 where the combination of the coil $L'_2$ and the transformer 5 is now replaced by a single coil $L''_2$ having a tap connected to the base of the transistor and unity coupling between its two portions. The circuit is otherwise the same as Fig. 4*b* and is therefore again the dual counterpart of the Hartley oscillator.

Figure 6:
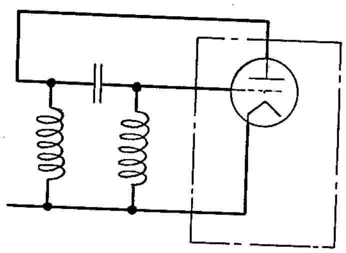
Figure 7:
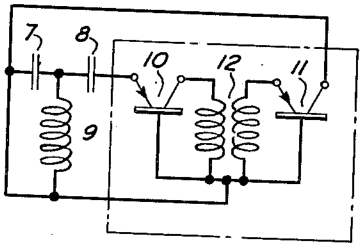
Fig. 7 is a schematic diagram showing the dual counterpart of Fig. 6.

A somewhat different approach to the problem of developing the dual counterpart of the Hartley oscillator is shown in Figs. 6 and 7. In Fig. 6 the Hartley oscillator is redrawn to bring out the fact that the output from the plate of the tube shown in a broken-line box, is fed back to the grid as its input by way of a network comprising a pair of coils in shunt and a condenser in series. Evidently the complete dual counterpart of this circuit can be arrived at in three steps;

*First*.—Constructing the dual counterpart of the amplifier shown in the broken-line box;

*Second*.—Constructing the dual counterpart of the external coupling network; and

*Third*.—Feeding back from the output of the box amplifier to its input by way of this dual circuit.

From the general principles set forth above wherein, in the dual transformation, series elements are replaced by shunt elements and vice versa while coils are replaced by condensers and vice versa, the dual counterpart of the network of Fig. 6 is that shown in Fig. 7, namely two condensers 7, 8 in series and a coil 9 between them connected in shunt. Furthermore, as has been explained above, the transistor is a close dual counterpart of the vacuum tube except for the fact that its output is in phase with its input, while with the tube the reverse is true. Therefore, merely by coupling two transistor amplifiers 10, 11 in tandem by way of a phase reversing transformer, the output current of the second transistor is brought into phase opposition with the input current of the first transistor. Thus, the combination of the two transistors with a phase inverting transformer 12 between them is the dual counterpart, for all purposes, of the vacuum tube in the amplifier of Fig. 6. Incidentally, the turns of the two windings of the phase inverting transformer 12 may be proportioned to furnish a desirable impedance match between the output impedance of the left-hand transistor and the input impedance of the right-hand transistor.

When the dual counterparts of the external network and of the amplifier itself have been individually constructed in the manner described above, it remains only to couple the amplifier output to its input by way of the dual coupling network and the transistor oscillator which is a dual counterpart of the vacuum tube. Hartley oscillator is complete.

Figure 8:
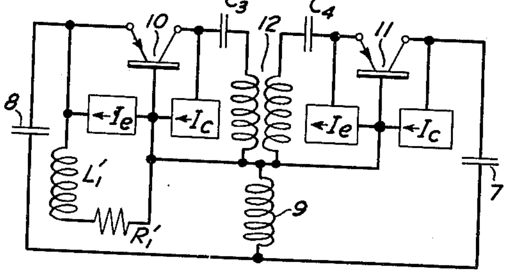
Fig. 8 is a schematic diagram showing a two-transistor oscillator which is essentially the same as that of Fig. 7 but contains in addition provision for supplying bias currents.

Fig. 8 is the same as Fig. 7 with the exception of the fact that the current sources required to bias the collectors and emitters of the transistors are included, the coil 9 and the condensers 7, 8 which determine the oscillation frequency being designated by the same symbol as before. Here the condensers $C_3$ and $C_4$ are merely stopping condensers to prevent the application of collector bias current or voltage to the base or emitter of a transistor.

The series combination of a resistor $R'_1$ and a coil $L'_1$ may be employed in combination with either or both of the transistors of Fig. 8 to provide self-bias and so control the amplitude of oscillation. This feature is shown for the left-hand transistor 10 of Fig. 8. It may be applied to the right-hand transistor 11 as well or instead, as desired.

*The dual of a Colpitts oscillator*

Figure 9:
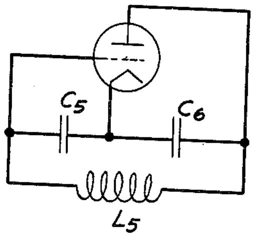
Fig. 9 is a schematic circuit diagram showing the signal frequency portions, only, of a vacuum tube oscillator circuit of the so-called "Colpitts" variety.

Fig. 9 is a schematic circuit diagram showing a vacuum tube oscillator of the Colpitts variety, bias sources and the grid-leak-condenser automatic bias combination of Fig. 4*a* being omitted in the interest of simplicity. It will be observed that this circuit can be derived from the circuit of Fig. 4*a* merely by interchanging coils and condensers without, however, interchanging series elements with parallel elements. Therefore, Fig. 9 is not the dual counterpart of Fig. 4*a* but differs from it rather in the sense that the coupling network of Fig. 9 is a low pass filter as compared with the high pass filter of Fig. 4*a* or Fig. 6. In view of this sole difference, the dual counterpart of the Colpitts oscillator may be constructed without carrying out the dual transformation on its defining equations, and merely by turning to Fig. 4*b* which was the dual counterpart of the Hartley oscillator of Fig. 4*a* and interchanging coils and condensers. When this has been done the circuit of Fig. 10 results wherein the condensers $C_5$ and $C_6$ of Fig. 9 have been replaced by the coils $L'_5$ and $L'_6$ of Fig. 10 while the coil of Fig. 9 is replaced by the condenser $C'_5$. The transformer 5' may be the same as the transformer 5 of Fig. 4*a*.

Figure 10:
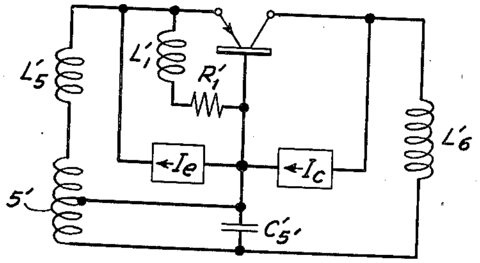
Fig. 10 is a schematic diagram of a transistor oscillator which is the dual counterpart of Fig. 9.

The frequency at which the transistor oscillator circuit of Fig. 10 oscillates is given by the following expression:

$$\omega=2\pi f=\sqrt{\frac{1}{C'_1}\left(\frac{1}{L'_1}+\frac{1}{L'_2}\right)} \qquad (14)$$

which may be compared with the corresponding well-known expression for the frequency of oscillation of the vacuum tube Colpitts oscillator:

$$\omega=2\pi f=\sqrt{\frac{1}{L_1}\left(\frac{1}{C_1}+\frac{1}{C_2}\right)} \qquad (15)$$

Figure 11:
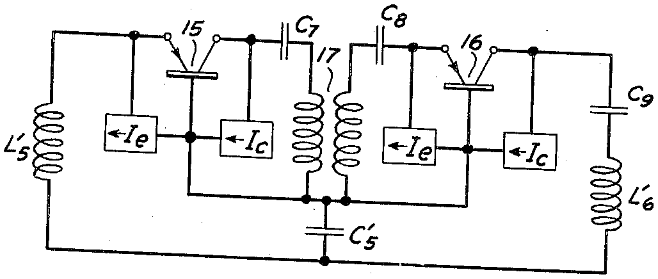
Fig. 11 is a schematic circuit diagram of a two-transistor oscillator which is another dual counterpart of the vacuum tube Colpitts oscillator.

As in the case of the Hartley oscillator the problem of constructing the dual counterpart of the Colpitts oscillator may be approached by a different avenue, namely, first, constructing the dual counterpart of the external feedback network; second, constructing the dual counterpart of the amplifier tube; and third, feeding back from the amplifier output to its input by way of the dual network. When this has been done the circuit of Fig. 11 results, wherein the coils $L'_5$ and $L'_6$ and the condenser $C'_5$ are the dual counterparts of the condensers $C_5$, $C_6$ and coil $L_5$ of Fig. 9. The condensers $C_7$, $C_8$, and $C_9$ of Fig. 11 are merely blocking condensers to prevent the application of collector bias voltage or current to the base or to the emitter of either of the transistors.

The dual counterpart of the amplifier tube of Fig. 9 may be constructed of a pair of transistors 15, 16, neither of which provides a phase inversion, coupled together by way of a phase inverting transformer 17, so that the collector output of the right-hand transistor is inverted in phase with respect to the mitter input of the left-hand transistor. As in the case of the dual of the Hartley oscillator, Figs. 7 and 8, advantage may be taken of the fact that a transformer is employed in order to obtain improved power transfer between the left-hand transistor and the right-hand transistor by appropriate proportioning of the turns ratio of the transformer winding.

*The dual of a phase-shift oscillator*

Figure 12:
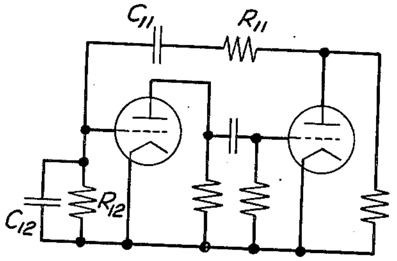
Fig. 12 is a schematic circuit diagram showing the signal frequency portions only of a resistance-capacity or so-called "phase-shift" vacuum tube oscillator.

Another vacuum tube oscillator circuit which has been successful and popular is the so-called R—C phase shift type. The prototype oscillator is the subject of Nichols Patent 1,442,781 while Hewlett Patent 2,268,872 shows a well-known refinement. The signal frequency portions of the circuit of the Hewlett patent are shown in Fig. 12, voltage bias sources, automatic level stabilizing devices and the like being omitted in the interests of simplicity. Here two vacuum tubes are employed, the output of the first being coupled in conventional fashion to the input of the second, while the output of the second is coupled by way of a first series combination of a resistor $R_{11}$ and a condenser $C_{11}$ to the grid of the first tube, which is at the same time returned to its cathode by way of a second parallel combination of a resistor $R_{12}$ and a condenser $C_{12}$.

Because of the fact that two tubes are employed in Fig. 12, the phase reversal of each tube counterbalances the phase reversal of the other tube so that, disregarding the effects of the intertube coupling network, the voltage at the anode of the right-hand tube is in phase with the voltage of the grid of the left-hand tube. Therefore, for sustained self-oscillation, a feedback path is required which provides no phase shift, or only such small amount of phase shift as compensates for a correspondingly small amount of phase shift provided by the intertube coupling network. Such a feedback path is provided in the manner shown wherein the phase shift of the series resistor-condenser combination is balanced by the equal and opposite phase shift of the parallel resistor-condenser combination while, because, of the fact that the first network is in series between output and input while the second network shunts the input, the voltage actually fed back from output to input rises to a maximum at just the frequency at which the net phase shift of the feedback path as a whole falls to zero.

Because, to a good approximation, there is no phase shift between the output of the second tube and the input of the first tube of Fig. 12, the dual counterpart might be constructed utilizing only a single transistor which, like the pair of tubes, provides no input-to-output phase shift. However, to compensate for losses in the feedback network it is preferred to employ two transistors 20, 21, intercoupled as before by way of an impedance matching transformer 22. Here, however, the transformer windings are so poled as not to produce a phase shift, so that the output of the right-hand transistor is in phase with the input to the left-hand transistor. By application of the rules set forth above, the dual counterpart of the external feedback coupling network may be easily arrived at. Thus the series combination of $R_{11}$ and $C_{11}$ in Fig. 12 becomes the parallel combination of $R'_{11}$ and $L'_{11}$ in Fig. 13, while the parallel combination of $R_{12}$ and $C_{12}$ in Fig. 12 becomes the series combination of $R'_{12}$ and $L'_{12}$ in Fig. 13. As in the case of Fig. 12, the phase shift provided by the series combination is equal and opposite to that provided by the parallel combination at the frequency of oscillation; and, with appropriate selection of the magnitudes of the parameters, the net feedback current is a maximum at this same frequency.

The frequency of oscillation of the vacuum tube oscillator of Fig. 12 is given by the expression:

$$\omega=2\pi f=\frac{1}{\sqrt{R_1R_2C_1C_2}} \qquad (16)$$

Figure 13:
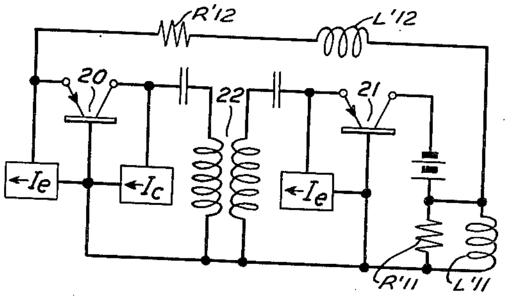
Fig. 13 is a schematic circuit diagram of a two-transistor oscillator which is the dual counterpart of the phase shift oscillator of Fig. 12.

Correspondingly, the frequency of oscillation of the transistor oscillator of Fig. 13 is given by the expression:

$$\omega=2\pi f=\sqrt{\frac{R'_1R'_2}{L'_1L'_2}} \qquad (17)$$

The correspondence between these two expressions is plain.

*The dual of a bridge stabilized oscillator*

Still another standard vacuum tube oscillator circuit of known excellent performance is the bridge-stabilized oscillator of which the prototype is shown in Meacham Patent 2,163,403 while a particularly convenient practical form is shown in Meacham Patent 2,303,485. The circuit of the latter patent is reproduced for convenient reference and comparison in Fig. 14. In this circuit the center tapped coil 25 is an autotransformer and, for purposes of exposition, is treated as an ideal transformer; that is to say, one in which the coupling coefficient between the two halves is unity and in which the losses are negligible. Furthermore the figure is simplified by omission of the power supply circuit including bias batteries and the like. The defining equations of the circuit are reproduced below the figure. In this circuit the stabilizing resistor $R_{14}$ is a temperature-sensitive element whose temperature coefficient of resistance is positive; i. e., its resistance increases with increase of the current flowing through it. The operation of the circuit is conveniently explained as follows.

Because of the characteristics of the vacuum tube its grid current is very small compared to currents elsewhere in the circuit and may therefore be neglected in the analysis. Therefore the current through the parallel tuned circuit in the upper right-hand branch of the bridge is sensibly equal to the current through the stabilizing resistor $R_{14}$ in the lower right-hand branch; that is to say $$i_X = i_{R_{14}} \quad (18)$$

approximately, hence, if the resistance of the element $R_{14}$ and the impedance of the tuned circuit $L_{14}$, $C_{14}$ are denoted R and X, respectively, $$\frac{e_R}{e_X} = \frac{R}{X} \quad (19)$$

Figure 14:
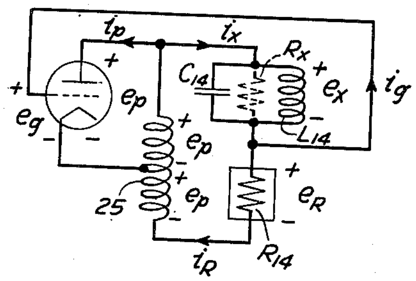
Fig. 14 is a schematic circuit diagram showing the signal frequency portions only of a bridge stabilized vacuum tube oscillator, together with its defining equations.

Furthermore from the third and fifth defining equations of Fig. 14

$$\frac{e_g}{e_p} = \frac{e_R - e_X}{e_R + e_X} \quad (20)$$

$$= \frac{\frac{e_R}{e_X} - 1}{\frac{e_R}{e_X} + 1} \quad (20a)$$

Substituting from Equation 19 into Equation 20*a* gives $$\frac{e_g}{e_p} = \frac{\frac{R}{X} - 1}{\frac{R}{X} + 1} \quad (21)$$

Now at the frequency to which the coil-condenser combination $L_{14}$, $C_{14}$ resonates, its impedance is a pure high resistance $R_x$, indicated by a broken-line resistor on the drawing. Then, at resonance $$\frac{e_g}{e_p} = \frac{\frac{R}{R_x} - 1}{\frac{R}{R_x} + 1} \quad (22)$$

Now if the resistance R of the stabilizing resistor $R_{14}$ is less than the resistance $R_x$ of the tuned circuit at resonance, the sign of the ratio of grid voltage to plate voltage as given by (22) is negative as it must be for oscillation; that is, the feedback is positive. Furthermore the smaller the magnitude R of the resistor $R_{14}$, the greater the amount of this positive feedback.

If R is sufficiently small, self-oscillation commences due to any minute disturbance in well-known fashion, and the amplitude of oscillation tends to increase. As the amplitude increases, however, the current through the resistor $R_{14}$ increases and, because of its positive temperature coefficient its magnitude increases, this reducing the feedback with the result that self-oscillations of stable amplitude are produced, the amplitude being controlled by the relative magnitudes of the resistor $R_{14}$ and the resonant resistance $R_x$ of the tuned circuit. The frequency of self-oscillation is that at which the coil $L_{14}$ and the condenser $C_{14}$ resonate to produce a pure resistance for the effective impedance of the tuned circuit. Provided parasitic resistances are not too high, this is closely given by $$\omega = 2\pi f = \frac{1}{\sqrt{L_{14}C_{14}}} \quad (23)$$

Figure 15:
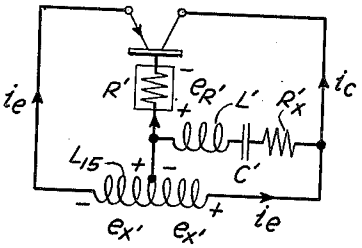
Fig. 15 is a schematic circuit diagram showing a transistor oscillator which is the dual counterpart of the oscillator of Fig. 14, together with its defining equations.
Figure 16:
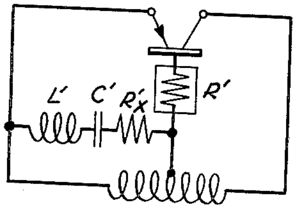
Figs. 16, 17 and 18 are schematic circuit diagrams showing transistor oscillators alternative to that of Fig. 15.
Figure 17:
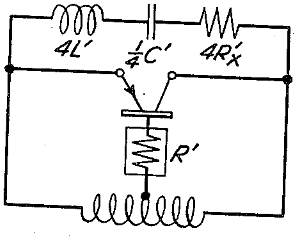
Figure 18:
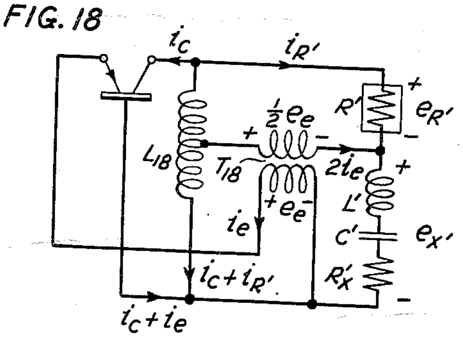

To the right of the defining equations under Fig. 14 their dual counterparts are reproduced. From what has been said above it will be understood that these latter equations define a transistor oscillator circuit which is the dual counterpart of the vacuum tube oscillator of Fig. 14. A number of transistor circuits which satisfy these equations may be constructed. Fig. 15 shows one such transistor circuit while Figs. 16, 17 and 18 show others. In these figures, as in others of this specification, the steady current supply circuits and bias sources are omitted to simplify the drawings. They may be added as desired in the manner fully explained in connection with other figures. In the first three of these figures the inductance winding which interconnects the emitter of the transistor with its collector is assumed to be an ideal transformer in the sense above defined, and the center tap of this transformer is connected by way of a stabilizing resistor R′ to the base of the transistor, while in Fig. 18 the transformer and its center tap are otherwise connected and the stabilizing resistor R′ appears at a different part of the circuit.

Two principal features are common to the circuits of Figs. 15, 16, 17 and 18. The first of these features is that the stabilizing resistor R′, as the dual counterpart of the stabilizing resistor $R_{14}$ of Fig. 14, is now characterized by a negative temperature coefficient; that is to say its resistance diminishes with increasing current through it. The second principal common feature is that the tuned circuit L′, C′, as the dual counterpart of the tuned circuit of Fig. 14, is now a series tuned circuit, so that its impedance at the frequency of resonance is now lower than at other frequencies and is in fact a comparatively small pure resistance $R'_x$. As a practical matter it is found that the unavoidable ohmic resistance of the coil L′ usually suffices to furnish this resistance, though a padding resistor can be added in well-known fashion if desired.

Because the center-tapped inductance winding of Fig. 15 is an ideal transformer, it is of no consequence whether the series tuned circuit is connected across its right-hand half, as in Fig. 15, across its left-hand half, as in Fig. 16 or across both halves together as in Fig. 17. Here, however, because the transformer has a four-to-one step-up ratio the impedance of the tuned circuit, for comparable performance, is preferably four times as great at all frequencies as in the case of Figs. 15 and 16. One convenient way to secure this result is to arrange that each of the three elements which go to make up this series tuned circuit shall individually have an impedance which is four times as great. These modified impedance values are indicated on the figure.

Though it is plain that the simple circuits of Figs 15, 16 and 17 are indeed dual counterparts of the circuit of Fig. 14, still it is not obvious that any of them embodies a stabilizing bridge. This, however, is clearly brought out in Fig. 18 which, as stated above, is also a dual counterpart of the vacuum tube oscillator of Fig. 14. Here the bridge circuit is quite evident, its upper and lower left-half branches being composed of the two halves of the ideal transformer $L_{18}$, while the upper and lower right-hand branches are composed respectively of the stabilizing resistor R′ and the tuned circuit L′, C′, $R'_x$. The output of the transistor regarded as an amplifier is derived from its base and collector terminals and applied to the upper and lower terminals of the bridge, while the input between the base and the emitter of the transistor is derived from the conjugate terminals of the bridge by way of a second, properly poled, transformer $T_{18}$ connected between the center tap of the ideal transformer $L_{18}$ and the junction point between the stabilizing resistor R′ and the tuned circuit.

The operation of the circuit of Fig. 18 may be explained in a manner closely parallelling that given above for the vacuum tube oscillator of Fig. 14, as follows:

In the case of the transistor, the emitter electrode voltage is very small and may be neglected as compared with other voltages, that is $$-e_e=0 \qquad (24)$$

so that, approximately, $$e_{X'}=e_{R'} \qquad (25)$$

Hence $$X' i_{X'}=R' i_{R'} \qquad (26)$$

or $$\frac{i_{X'}}{i_{R'}}=\frac{R'}{X'} \qquad (27)$$

But from the equations reproduced below Fig. 15, which, as stated above apply as well to Fig. 18, $$\frac{i_e}{i_c}=\frac{-i_{X'}+i_{R'}}{i_{X'}+i_{R'}} \qquad (28)$$

$$=\frac{1-\frac{i_{X'}}{i_{R'}}}{1+\frac{i_{X'}}{i_{R'}}} \qquad (29)$$

Substituting (27) into (29) gives $$\frac{i_e}{i_c}=\frac{1-\frac{R'}{X'}}{1+\frac{R'}{X'}} \qquad (30)$$

Now at resonance the series L'—C' circuit appears to be a pure resistance $R_x'$ so that, at resonance, $$\frac{i_e}{i_c}=\frac{1-\frac{R'}{R_x'}}{1+\frac{R'}{R_x'}} \qquad (31)$$

Now if R' is greater than $R_x'$, the sign of this ratio is negative as it must be for oscillation. That is, the feedback is positive; and furthermore the larger R', the greater the positive feedback.

If R' is sufficiently large oscillations commence due to random disturbances, and the amplitude of oscillation tends to increase. As the amplitude increases, however, R' decreases and the positive feedback is reduced, with the result that stable self-oscillations, limited in amplitude by R', are generated. The frequency of such oscillations is that at which L' and C' resonate to produce a pure resistance. This is $$\omega=2\pi f=\frac{1}{\sqrt{L'C'}}$$

Subject matter which is related to the foregoing is disclosed and claimed in R. L. Wallace, Jr. Patents 2,620,448 and 2,652,460, issued December 2, 1952, and September 15, 1953, respectively. Each of these patents is based on an application filed September 12, 1950.

What is claimed is:

1. A stabilized transistor oscillator circuit which comprises a transistor having a base electrode, an emitter electrode and a collector electrode, an inductance winding having two end terminals and an intermediate tap and being characterized by substantially unity coupling between the two parts defined by said tap, one of said end terminals being connected to said emitter electrode, the other of said end terminals being connected to said collector electrode, a non-linear resistance element having a negative temperature coefficient interconnecting the base electrode of said transistor with said tap, and a series tuned resonant circuit shunting at least a portion of said winding.

2. Apparatus as defined in claim 1 wherein said series-tuned resonant circuit is connected between said intermediate tap and said emitter electrode.

3. Apparatus as defined in claim 1 wherein said series-tuned resonant circuit is connected between said intermediate tap and said collector electrode.

4. Apparatus as defined in claim 1 wherein said series-tuned resonant circuit is connected in shunt with said entire winding.

5. Apparatus as defined in claim 1 wherein said series-tuned resonant circuit includes a resistor of magnitude less than that of said non-linear resistance element under oscillation conditions.

6. Apparatus which comprises a transistor having a base electrode, an emitter electrode and a collector electrode, said base and collector electrodes constituting output terminals, an inductive impedance element having two end terminals and an intermediate tap and being characterized by substantially unity coefficient of coupling between the two parts of said winding defined by said tap, said two end terminals being connected to the output terminals of said transistor, respectively, a non-linear resistor having a negative temperature coefficient, a series resonant circuit comprising a coil, a condenser, and a small resistance connected in series with said non-linear element, the two ends of said series combination being connected, respectively, to the two ends of said inductive impedance winding, the common point of said tuned circuit and of said non-linear resistance element being connected to the intermediate tap of said winding, said winding, said non-linear element and the elements of said tuned circuit constituting a bridge of which the end terminals of said winding are two bridge terminals while said common point and said intermediate tap are two other terminals, approximately conjugate to the first two, means for deriving a signal from said conjugate terminals, and means for applying said signal to the emitter electrode of said transistor.

References Cited in the file of this patent

UNITED STATES PATENTS

| Number | Name | Date |
|---|---|---|
| 2,163,403 | Meacham | June 20, 1939 |
| 2,524,035 | Berdeen et al. | Oct. 3, 1950 |
| 2,556,286 | Meacham | June 12, 1951 |
| 2,556,296 | Rack | June 12, 1951 |
| 2,570,436 | Eberhard et al. | Oct. 9, 1951 |

OTHER REFERENCES

"The Transistor, A Semi-Conductor Triode" by Bardeen and Brattain, Physical Review, vol. 74, pages 230–233, July 15, 1948.

"Transistor Oscillator," by Lehan, Electronics, pages 90 and 91, August 1949.